(No Model.) 3 Sheets—Sheet 1.
R. JEWELL.
ELECTRICAL REGISTER FOR MEASURING PUMPS.
No. 453,484. Patented June 2, 1891.
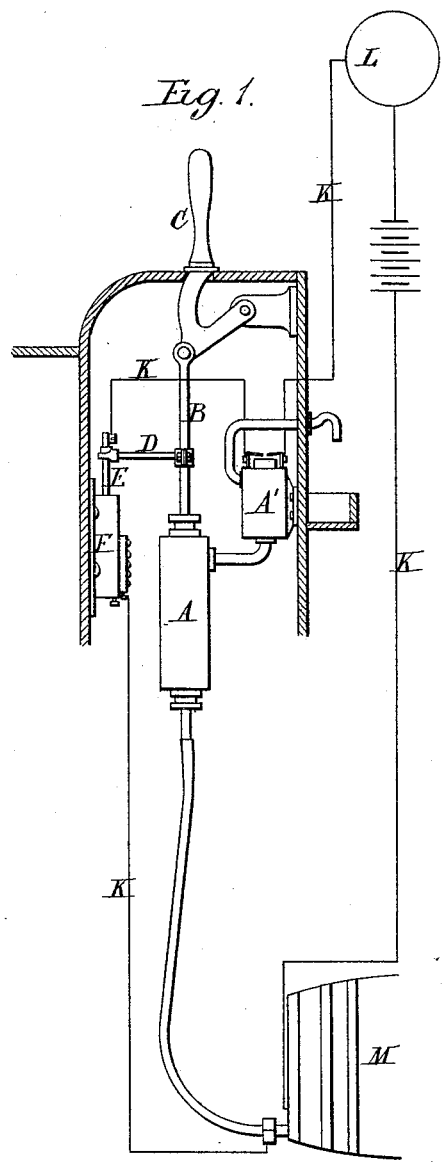
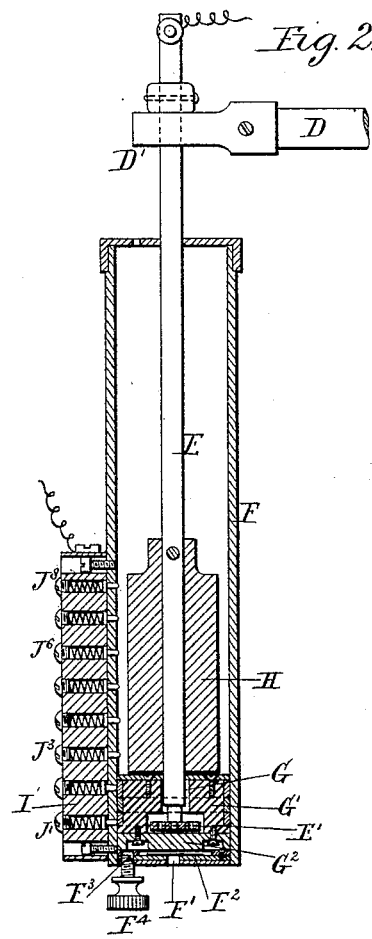

(No Model.) 3 Sheets—Sheet 2.
R. JEWELL.
ELECTRICAL REGISTER FOR MEASURING PUMPS.
No. 453,484. Patented June 2, 1891.
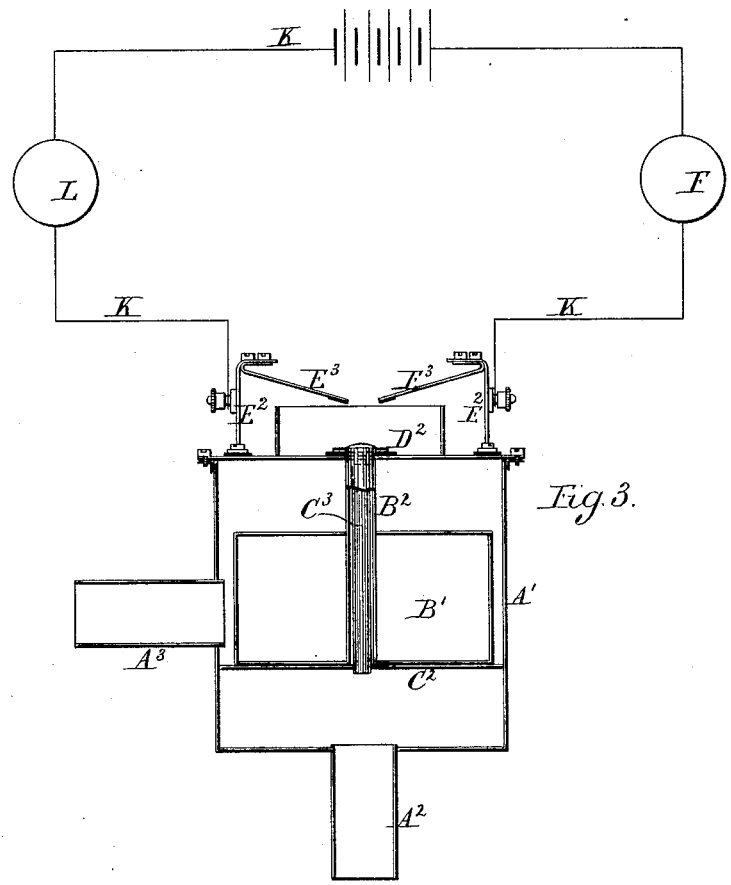
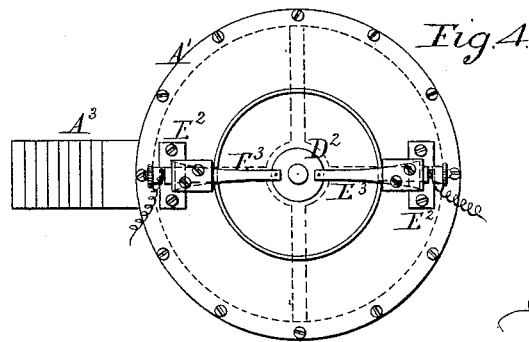

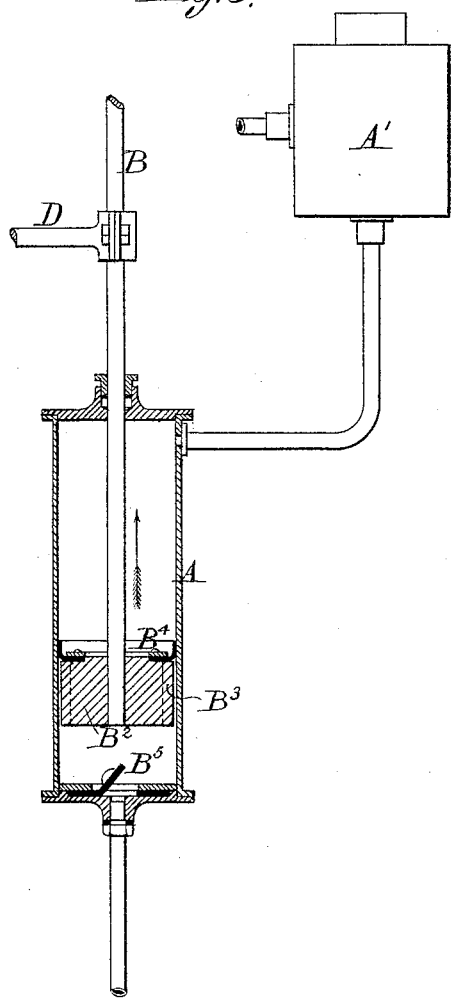

UNITED STATES PATENT OFFICE.

ROBERT JEWELL, OF LONDON, ENGLAND.

ELECTRICAL REGISTER FOR MEASURING PUMPS.

SPECIFICATION forming part of Letters Patent No. 453,484, dated June 2, 1891.

Application filed June 20, 1890. Serial No. 356,096. (No model.) Patented in England August 15, 1889, No. 12,904, August 30, 1889, No. 13,708, and October 8, 1889, No. 15,804; in France June 12, 1890, No. 206,330; in Germany June 14, 1890, No. 54,898, and in Italy November 30, 1890, LVI, 139.

*To all whom it may concern:*

Be it known that I, ROBERT JEWELL, a citizen of England, residing at 9 Victoria Road, Battersea Park, in the county of Surrey, England, have invented new and useful Improvements in Apparatus for Controlling and Registering Quantities of Beer and other Liquids Drawn from Pumps or Beer-Engines, (for which I have obtained patents in Great Britain, dated August 15, 1889, No. 12,904, dated August 30, 1889, No. 13,708, and dated October 8, 1889, No. 15,804; in France, dated June 12, 1890, No. 206,330; in Germany, dated June 14, 1890, No. 54,898, and in Italy, dated November 30, 1890, Vol. LVI, 139,) of which the following is a specification.

My invention relates to apparatus for controlling the quantities of liquid—such as beer, &c.—drawn off through pumps or beer-engines and to effect the registration either of such quantities or of their money value, in order to prevent fraud on the part of servants who draw the liquid and dispense it to the customers.

Such apparatus to be of practical value must comply with the following conditions:

*a.* Assuming that by the full stroke of the pump lever or "pull" one liter of liquid is drawn, then the apparatus must be so arranged as to register not only the full stroke of the lever, but also any desired small fractional part of the stroke—such, for example, as would draw only a deciliter of liquid—as otherwise the servant could by repeatedly moving the pump-lever through a very small distance draw a considerable quantity of liquid without registration.

*b.* The apparatus connected with the pump-lever must be so arranged that after drawing a certain quantity of liquid the servant can again move the lever through a small distance for giving the so-called "after-dash"—that is, for discharging a small further quantity of liquid for accurately filling the measure without again actuating the registering mechanism.

*c.* The apparatus must be so connected to the registering mechanism that when by the motion of the pump-lever only air or froth is being discharged such motion shall not be registered on the registering mechanism.

For fulfilling these conditions I construct the apparatus as I will describe with reference to the accompanying drawings, in which—

Figure 1 shows a diagram view of the entire apparatus; Fig. 2, an enlarged vertical section of the contact apparatus; Figs. 3 and 4, an enlarged section and plan of the apparatus for preventing registration when only air or froth is being discharged. Fig. 5 is a detail sectional elevation showing the interior of the pump-cylinder.

In the drawings, the letter A indicates a pump-cylinder, having a loosely-fitting heavy piston $B^2$, provided with grooved passages $B^3$ at its periphery and with a cup-leather $B^4$, so as to act as a lift-valve, while $B^5$ is the suction-valve. The piston-rod B is connected to the lever or pull C, on pulling which downward the piston forces up the beer through the discharge-pipe, while at the same time a fresh charge of beer is drawn by the suction into the cylinder below through the suction-valve $B^5$. On releasing the pull the piston $B^2$ will descend in the cylinder by its weight, while at the same time the beer below it will pass through the passages $B^3$ and cup-leather $B^4$ to the upper side. To the piston-rod is attached, by preference in an adjustable manner, an arm D, terminating in a fork or eye D′, that embraces loosely the rod E of the contact apparatus. This apparatus consists of a cylinder F, of insulating material, closed at top and bottom, with the exception of small air-holes, in which is a piston G, connected to the rod E, which carries a weight H above the piston. The piston consists of an upper part G′, of insulating material, and a lower part $G^2$, of conducting metal, fixed to G′. The rod E, which is also of conducting metal, passes loosely through the part G′ into a cavity between the two parts, and is there provided with a head E′, which has a small amount of play between G′ and $G^2$, so that when the rod E is moved upward by arm D it first moves slightly up, bringing its head out of contact with $G^2$ and in contact with G′, and it then raises the piston up in the cylinder. On relieving the rod E of the pull of the arm D the rod, being weighted by H, will first move downward to a slight extent without moving the piston until its head comes in contact with the part $G^2$, and the weight then causes the rod and piston to slide down in the cylinder.

To the side of the lower part of the cylinder is fixed a metal piece I, in which are a number of sliding pins $J'$ $J^2$, &c., projecting slightly through the side of cylinder F, and held in that position by springs, as shown. These pins and the piece I are put in connection with the one lead of an electrical circuit K, including the electrical registering mechanism L, by which the quantities of liquid drawn are to be registered, and which may be of any suitable construction, by preference such as those described in my application. The other lead of the circuit K is connected to the rod E, which is insulated in any suitable manner from the arm D. From this arrangement it will be seen that when the pull C is moved through a certain distance for drawing a certain quantity of liquor, the arm D will raise piston G a corresponding distance in the cylinder F. The part $G^2$ will thereby be brought successively in conducting contact with a certain number of the pins $J'$ $J^2$, &c.; but as the rod E is at that time not in conducting contact with the part $G^2$ the electric circuit K will not be closed, and consequently no registration of such motion will be effected on the counter L. When the required quantity has been drawn and the pull is moved back so that the arm D moves down away from the collar on the rod E, this will first make contact with $G^2$, as described, and the two parts will then descend in the cylinder, thereby completing the circuit and actuating the counter every time the part $G^2$ moves past one of the pins $J'$ $J^2$, &c., so that according to the greater or less amount of liquor drawn, and the consequent greater or less height to which the piston was raised, a greater or less number of contacts will be made and registration of units be effected. Thus assuming that it be required to register the value of every deciliter of liquor drawn, then the pull in drawing that quantity of liquor will only raise the piston past the lowest contact-pin $J'$, and on the return motion only a single registration will be effected. If three-quarters are drawn, the piston will make three contacts, and so on. To enable the piston to rise freely during the upward movement, but to descend at any desired slower speed, so as to give sufficient time between the successive contacts to effect the proper registration on the counter, the bottom of the cylinder F has a hole $F'$, through which air can enter freely, but the escape of air through which is more or less prevented by an internal spring-valve $F^2$, and it has a second hole $F^3$, in which is screwed a plug $F^4$, that has one of its sides cut away at an incline, so that according as the plug is screwed more or less in it will leave a greater or less hole for the escape of air, and will consequently retard the descent of the piston to a corresponding extent.

The above-described arrangement also has the advantage of permitting the so-called "after-dash" to be given after a certain quantity of liquor has been drawn—namely, after the pull C has been moved back after drawing the liquid the slower descent of the rod E will have caused the arm D to have moved down sufficiently far from the collar of the rod to allow of the pull being again drawn down sufficiently to give the after-dash without again raising the rod and piston thereby, and consequently without actuating the counter by such movement, which is an essential requirement of the trade.

For the cylinder and piston in the above-described construction may be substituted a weighted sliding block constructed with insulating and conducting parts, operated in the same way as the piston by the rod E, such block working on or between guides and sliding in contact with pins, such as $J'$ $J^2$, projecting through a fixed insulating-plate, the speed of descent of the block being regulated by springs thereon made to bear with adjustable frictional contact against the guides.

In order to prevent any movement of the pull from effecting a registration on the counter during the time that the suction-pipe of the pump is separated from the cask M for the purpose of changing the latter, I prefer to arrange the circuit-wires K in connection with the union of the cask in any known manner, so that when the union is detached from the cask the circuit is broken.

In cases where it may happen, more particularly after connecting a fresh cask, that the pull C has to be worked several strokes while only drawing air or froth, I prevent such movements from effecting any registrations on the counter by providing on the discharge-pipe of the pump a contact apparatus, such as is shown at $A'$, Figs. 1, 3, and 4.

A is a vessel communicating at $A^2$ with the discharge-pipe of the pump and at $A^3$ with the discharge-nozzle of the beer or other engine. Within this vessel is a float $B'$, which, when the vessel is empty, rests on the lowered position shown upon a perforated support $C^2$ of the vessel $A'$. This float can slide up and down freely with a central tube $B^2$ on a guide-rod $C^3$, fixed to the support $C^2$. The upper end of the tube $B^2$ passes through a hole in the top of the vessel and carries at its end a disk $D^2$, of insulating material, on the upper face of which is fixed a plate of conducting metal. To the top of the vessel $A'$ are fixed two insulated standards $E^2$ $E^2$, carrying contact-springs $E^3$ $E^3$, forming parts of the electric circuit K, Fig. 1.

From the above-described arrangement it will be seen that so long as only the air or froth is being drawn through the pump, the vessel $A'$ being empty, the float will remain in its lowered position, and the circuit K being broken between the springs E³ E³ no registration of the movements of the pump lever or pull will be effected; but as soon as liquid is passing through, the vessel A' becoming filled, the float will rise, and its disk will consequently press against both the springs E³ E³, thereby closing the circuit K and causing the further movements of the pump in discharging liquid to be registered on the counter L.

By referring to Fig. 1 it will be observed that the discharge-pipe A³ from the float-vessel A' rises some distance above the top wall of such vessel and then connects with the delivery-nozzle A⁴. When the upstroke of the pump-piston stops, the interiors of the vessel A' and of the pump A³ remain full of liquid while the pump-piston descends, because the liquid is retained in the pump-barrel by the suction-valve, and the liquid therein is simply displaced from below to above the piston. In consequence of this the float will remain in the raised position, and the circuit will remain closed as regards the contact-springs E³.

Having thus described the nature of this invention and the best means I know for carrying the same into practical effect, I claim—

1. In apparatus for controlling and registering quantities of beer and other liquids discharged from beer engines or pumps, the combination, with the pump rod or lever, of a vertical slide raised by an arm on the pump rod or lever and moving past a series of electrical contacts connected through an electrical circuit with a registering mechanism or counter, so that the slide in passing such contacts is made to close the circuit, the connection between the slide and the arm being a loose one, so that on the descent of the arm after raising the slide it leaves the latter free to descend by gravity at a slower speed, substantially as and for the purposes described.

2. In apparatus for controlling and registering quantities of beer and other liquids discharged from beer engines or pumps, the combination, with the pump rod or lever, of a vertical slide made partly of insulating material and partly of conducting material, raised by an arm on the pump rod or lever and moving past a series of electrical contacts connected through an electrical circuit with a registering mechanism or counter, and a rod connected to the second lead of the circuit, establishing the connection between the slide and the arm of the pump-rod, which connecting-rod on the rising of the slide is in contact with an insulating part of the latter, so that the circuit is broken, while on the descent of the slide the rod is in contact with a conducting part of the latter, so that the circuit is closed, substantially as and for the purposes described.

3. In apparatus for controlling and registering quantities of beer and other liquids discharged from beer engines or pumps, the combination, with the pump rod or lever, of a vertically-moving piston-shaped slide made partly of insulating and partly of conducting material, contained in a cylinder of insulating-material in which are a series of vertically arranged electrical contacts connected through an electrical circuit with a registering mechanism or counter, a rod connected to the second lead of the circuit, establishing the connection between the piston-slide and the arm of the pump-rod, and an air-inlet valve and a regulated air-discharge opening in the bottom of the cylinder, whereby the descent of the piston-slide in the cylinder can be controlled, substantially as described.

4. In apparatus for controlling and registering quantities of beer and other liquids discharged from beer engines or pumps, the combination, with the pump, of an electrical circuit actuating a registering mechanism or counter, a contact mechanism actuated by the pump rod or lever so as to close the circuit and actuate the registering mechanism every time the pump-lever is moved, and a vessel containing a float communicating with the discharge-pipe of the pump, said float being made to close a contact on the said electric circuit and render the registering device operative when the vessel is filled with liquid and to break said contact, so as to render the registering mechanism inoperative, when the vessel only contains air or froth, substantially as and for the purposes described.

5. In combination with a pump for discharging liquid, an electrical circuit, with contact device arranged to actuate a registering mechanism every time the pump-lever is moved, a vessel communicating with the discharge-pipe of the pump and containing a float, and a contact on the said electrical circuit, which is closed by the rising of the float on the vessel being charged with liquid, but which is broken on the descent of the float when the vessel is empty, substantially as and for the purposes described.

In testimony whereof I have signed my name to this specification, in the presence of two subscribing witnesses, this 9th day of June, A. D. 1890.

ROBERT JEWELL.

Witnesses:
 OLIVER IMRAY,
*U. S. Patent Agent, 28 Southampton Buildings, London, W. C.*
 JNO. P. M. MILLARD,
*Clerk to Messrs. Abel & Imray, Consulting Engineers and Patent Agents, 28 Southampton Buildings, London, W. C.*